(12) United States Patent
Chopde

(10) Patent No.: US 8,706,874 B2
(45) Date of Patent: Apr. 22, 2014

(54) REMOTE CONFIGURATION OF A HARDWARE SETTING ON ONE OR MORE TARGET COMPUTING DEVICE(S)

(75) Inventor: Harshal A. Chopde, Maharashtra (IN)

(73) Assignee: Nvidia Corporation, Santa Clara, CA (US)

( * ) Notice: Subject to any disclaimer, the term of this patent is extended or adjusted under 35 U.S.C. 154(b) by 123 days.

(21) Appl. No.: 13/594,929

(22) Filed: Aug. 27, 2012

(65) Prior Publication Data

US 2014/0059143 A1 Feb. 27, 2014

(51) Int. Cl.
G06F 15/173 (2006.01)

(52) U.S. Cl.
USPC ........... 709/224; 709/223; 709/217; 709/245; 711/118; 370/241

(58) Field of Classification Search
USPC .................. 709/224, 223, 217, 245; 711/118; 370/241
See application file for complete search history.

(56) References Cited

U.S. PATENT DOCUMENTS

| | | | | |
|---|---|---|---|---|
| 6,041,041 | A * | 3/2000 | Ramanathan et al. | 370/241 |
| 6,684,247 | B1 * | 1/2004 | Santos et al. | 709/224 |
| 7,467,230 | B2 * | 12/2008 | Majumdar et al. | 709/245 |
| 7,478,148 | B2 * | 1/2009 | Neerdaels | 709/223 |
| 8,117,296 | B2 * | 2/2012 | Liu et al. | 709/223 |
| 2005/0044213 | A1 * | 2/2005 | Kobayashi et al. | 709/224 |
| 2006/0184640 | A1 * | 8/2006 | Hatch | 709/217 |
| 2010/0274970 | A1 * | 10/2010 | Treuhaft et al. | 711/118 |

* cited by examiner

Primary Examiner — Tammy Nguyen
(74) Attorney, Agent, or Firm — Raj Abhyanker, P.C.

(57) ABSTRACT

A method includes registering one or more target computing device(s) with a request processing module of a server computing device and an application executing on a client computing device communicatively coupled to the server computing device, and initiating, through the application, a request to configure a hardware setting on the one or more target computing device(s) based on a communication mechanism. The method also includes processing, through the request processing module, the request to generate a validated message related to the hardware setting configuration and to extract information related to identifiers of the one or more target computing device(s), a hardware thereof and the hardware setting. Further, the method includes redirecting the validated message to the one or more target computing device(s) along with the extracted information, and interpreting the received validated message and the extracted information at the one or more target computing device(s).

20 Claims, 8 Drawing Sheets

REMOTE CONFIGURATION OF A HARDWARE SETTING ON ONE OR MORE TARGET COMPUTING DEVICE(S)

FIELD OF TECHNOLOGY

This disclosure relates generally to computing devices and, more particularly, to remote configuration of a hardware setting on one or more target computing device(s).

BACKGROUND

An administrator of a computer network may be required to run diagnostic tests (e.g., stress tests) on a number of computing devices. The aforementioned diagnostic tests may involve modifying hardware settings on the number of computing devices at various points in time. The administrator may have to manually interface with the individual computing devices to modify the hardware settings. The administrator may choose to use remote access software (e.g., VNC®) to access an individual target computing device from a remote location. However, the administrator may be required to have Virtual Private Network (VPN) network access in order to be able to configure settings on the individual target computing device utilizing the remote access software. The process involved therein may, therefore, be time consuming and inefficient.

SUMMARY

Disclosed are a method, an apparatus and/or a system of remote configuration of a hardware setting on one or more target computing device(s).

In one aspect, a method includes registering one or more target computing device(s) with a request processing module of a server computing device and an application executing on a client computing device communicatively coupled to the server computing device, and initiating, through the application, a request to configure a hardware setting on the one or more target computing device(s) based on a communication mechanism. The method also includes processing, through the request processing module, the request to generate a validated message related to the hardware setting configuration and to extract information related to a first identifier of the one or more target computing device(s), a second identifier of a hardware of the one or more target computing device(s) to which the hardware setting is to be applied, and a third identifier of the hardware setting.

Further, the method includes redirecting the validated message to the one or more target computing device(s) along with the extracted information, and interpreting, through another application executing on the one or more target computing device(s), the received validated message and the extracted information to enable application of the hardware setting to the hardware of the one or more target computing device(s).

In another aspect, a server computing device includes a memory including instructions associated with a request processing module stored therein, and a processor communicatively coupled to the memory and configured to address storage locations of the memory to execute the request processing module thereon. The processor is further configured to execute instructions to enable registration of one or more target computing device(s) with the request processing module, and to receive, from a client computing device also communicatively coupled to the server computing device, a request to configure a hardware setting on the one or more target computing device(s) based on a communication mechanism. The one or more target computing device(s) is also registered with an application executing on the client computing device configured to enable initiation of the request.

The processor is further configured to execute instructions to process, through the request processing module, the received request to generate a validated message related to the hardware setting configuration and to extract information related to a first identifier of the one or more target computing device(s), a second identifier of a hardware of the one or more target computing device(s) to which the hardware setting is to be applied, and a third identifier of the hardware setting, and to redirect the validated message to the one or more target computing(s) device along with the extracted information to enable interpretation of the validated message and the extracted information at the one or more target computing device(s) in order to apply the hardware setting to the hardware.

In yet another aspect, a communication system includes a server computing device configured to execute a request processing module thereon, a client computing device communicatively coupled to the server computing device and configured to execute an application thereon, and one or more target computing device(s) also communicatively coupled to the server computing device and configured to execute another application thereon. The one or more target computing device(s) is configured to be registered with the application executing on the client computing device. The server computing device is further configured to enable registration of the one or more target computing device(s) with the request processing module, and to receive, through the request processing module, a request initiated through the application executing on the client computing device to configure a hardware setting on the one or more target computing device(s) based on a communication mechanism.

The server computing device is further configured to process, through the request processing module, the received request to generate a validated message related to the hardware setting configuration and to extract information related to a first identifier of the one or more target computing device(s), a second identifier of a hardware of the one or more target computing device(s) to which the hardware setting is to be applied, and a third identifier of the hardware setting, and to redirect the validated message to the one or more target computing device(s) along with the extracted information. The one or more target computing device(s) is configured to interpret, through the another application executing thereon, the received validated message and the extracted information to enable application of the hardware setting to the hardware thereof.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 5 is an example user interface on the client computing device of FIG. 3 displaying angles to which the screen of a display unit of one or more target computing device(s) of FIG. 1 may be rotated and a corresponding graphics processor port to which the rotation corresponds to.

FIG. 6 is an example user interface on the client computing device of FIG. 3 displaying a list of the one or more target computing devices of FIG. 1 to which a hardware setting is to be applied to.

Other features of the present embodiments will be apparent from the accompanying drawings and from the detailed description that follows.

DETAILED DESCRIPTION

Example embodiments, as described below, may be used to provide a method, an apparatus and/or a system of remote configuration of a hardware setting on one or more target computing device(s). Although the present embodiments have been described with reference to specific example embodiments, it will be evident that various modifications and changes may be made to these embodiments without departing from the broader spirit and scope of the various embodiments.

Figure 1:
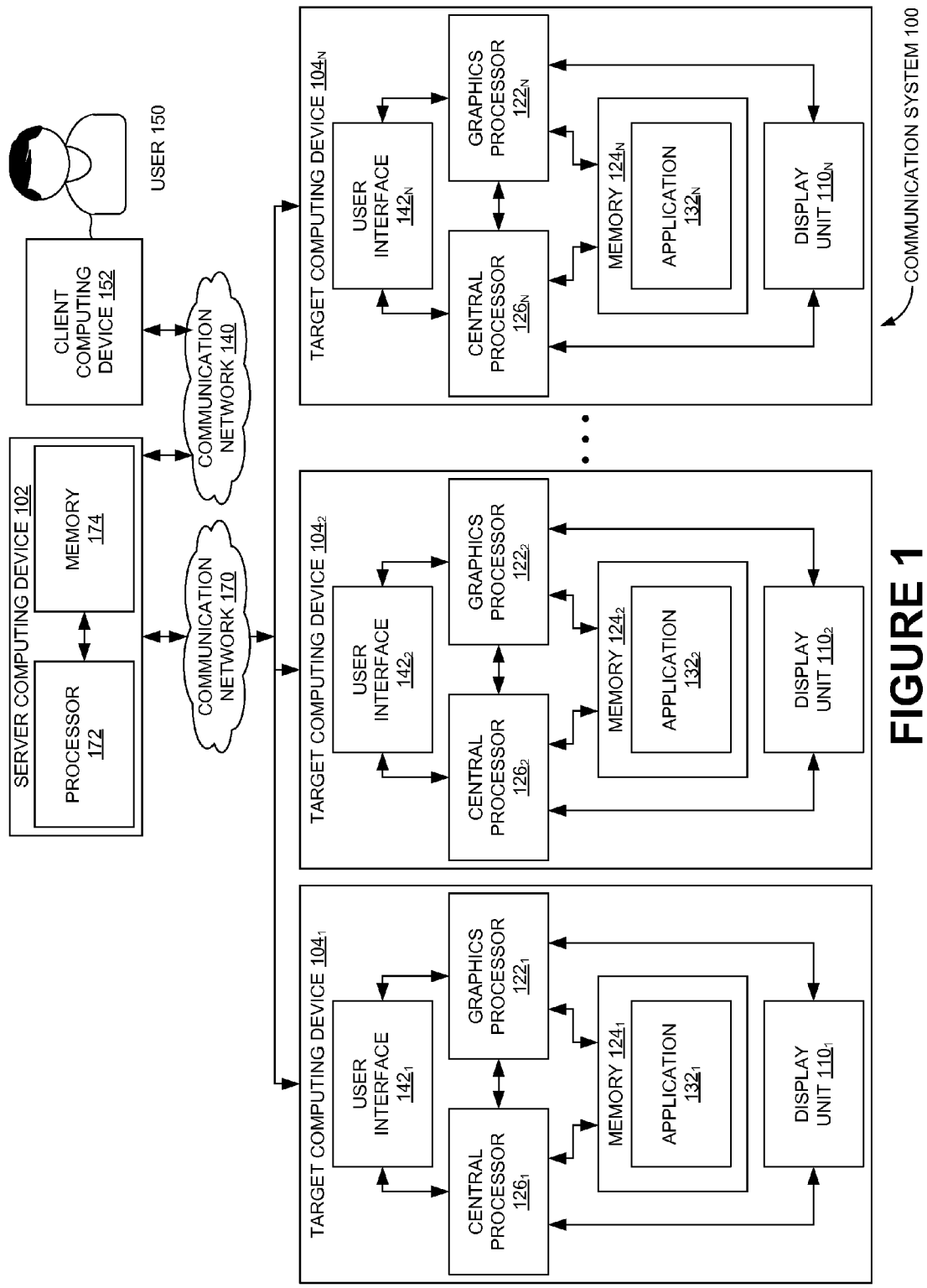
FIG. 1 is a schematic view of a communication system, according to one or more embodiments.

FIG. 1 shows a communication system 100, according to one or more embodiments. In one or more embodiments, communication system 100 may include a server computing device 102 configured to route messages to a number of target computing devices $104_{1-N}$ related to automatically configuring hardware (e.g., graphics processor $122_{1-N}$, display unit $110_{1-N}$) of target computing devices $104_{1-N}$. In one or more embodiments, server computing device 102 may be communicatively coupled to target computing devices $104_{1-N}$ through a communication network 170 (e.g., Internet, Local Area Network (LAN)). While FIG. 1 shows N target computing devices $104_{1-N}$ for the sake of generalization, in one embodiment, N can be merely 1. In other words, there may merely be one target computing device (e.g., target computing device $104_1$). In one or more embodiments, server computing device 102 may be a computing server. In one or more embodiments, each of target computing devices $104_{1-N}$ may be a desktop computer or a portable computer such as a laptop computer and a notebook computer.

In one or more embodiments, each of target computing devices $104_1$-N may have a graphics processor $122_{1-N}$ (e.g., a Graphics Processing Unit (GPU)) communicatively coupled to a memory $124_{1-N}$ (e.g., a volatile memory and/or a non-volatile memory). FIG. 1 also shows a central processor $126_{1-N}$ (e.g., a Central Processing Unit (CPU)) communicatively coupled to both memory $124_{1-N}$ and graphics processor $122_{1-N}$ (e.g., to instruct graphics processor $122_{1-N}$). In an alternate embodiment, each of central processor $126_{1-N}$ and graphics processor $122_{1-N}$ may have a separate memory associated therewith. While graphics processor $122_{1-N}$ is shown as being part of each target computing device $104_{1-N}$, it should be noted that target computing devices $104_{1-N}$ (e.g., desktop computers, laptop computers, notebook computers, mobile devices such as mobile phones) without graphics processors $122_{1-N}$ are also within the scope of the exemplary embodiments.

In one or more embodiments, each target computing device $104_{1-N}$ may have a display unit $110_1$-N associated therewith configured to render data thereon. FIG. 1 shows display unit $110_{1-N}$ being communicatively coupled to central processor $126_{1-N}$ and graphics processor $122_{1-N}$ for the sake of convenience. It is obvious that further processing of data from the processors (e.g., central processor $126_{1-N}$, graphics processor $122_{1-N}$) may be required to convert the aforementioned data into a suitable form for rendering on display unit $110_{1-N}$.

In one or more embodiments, each of target computing devices $104_{1-N}$ may have a user interface $142_{1-N}$ to enable configuration of hardware settings therein. FIG. 1 shows user interface $142_{1-N}$ as being communicatively coupled to central processor $126_{1-N}$ and graphics processor $122_{1-N}$. An example of user interface $142_{1-N}$ may be nVIDIA®'s Control Panel for GPU based computing devices. Exemplary embodiments discussed herein may dispense with a need for a user (e.g., user 150) to manually utilize user interface $142_{1-N}$ to update hardware settings of a corresponding target computing device $104_{1-N}$. In one or more embodiments, the aforementioned user (e.g., user 150) may be at a remote location from target computing devices $104_{1-N}$, and may still be able to apply desired hardware settings on target computing devices $104_{1-N}$ through initiating a request therefor at a client computing device 152 (e.g., a mobile phone, a desktop computer, a laptop computer) communicatively coupled to server computing device 102 through another communication network 140 (e.g., different from communication network 170, same as communication network 170). For the aforementioned purpose, server computing device 102 may provide a means to remotely edit hardware settings on target computing devices $104_{1-N}$ through various communication mechanisms such as text messages, e-mails and web applications. Other communications mechanisms are also within the scope of the exemplary embodiments.

Figure 2:
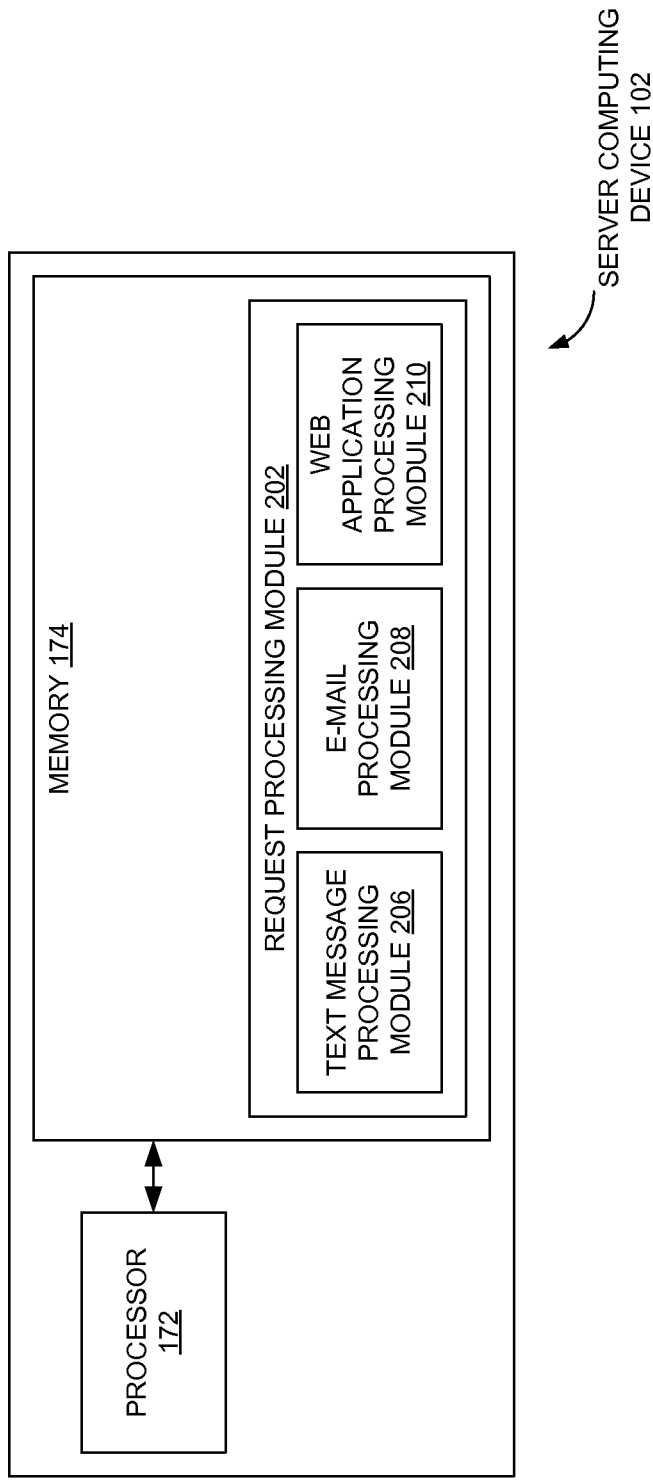
FIG. 2 is a schematic view of a processor and a memory of a server computing device of the communication system of FIG. 1.

In one or more embodiments, server computing device 102 may also have a processor 172 (e.g., a central processor) communicatively coupled to a memory 174 (e.g., a volatile memory and/or a non-volatile memory). Analogous to graphics processor $122_{1-N}$ and/or central processor $126_{1-N}$ of each target computing device $104_{1-N}$, processor 172 may be configured to address storage locations of memory 174. FIG. 2 shows processor 172 and memory 174 of server computing device 102, according to one or more embodiments. In one or more embodiments, memory 174 may include instructions associated with a request processing module 202 stored therein. The functionalities of request processing module 202 may better be understood with reference to example communication mechanisms.

Figure 3:
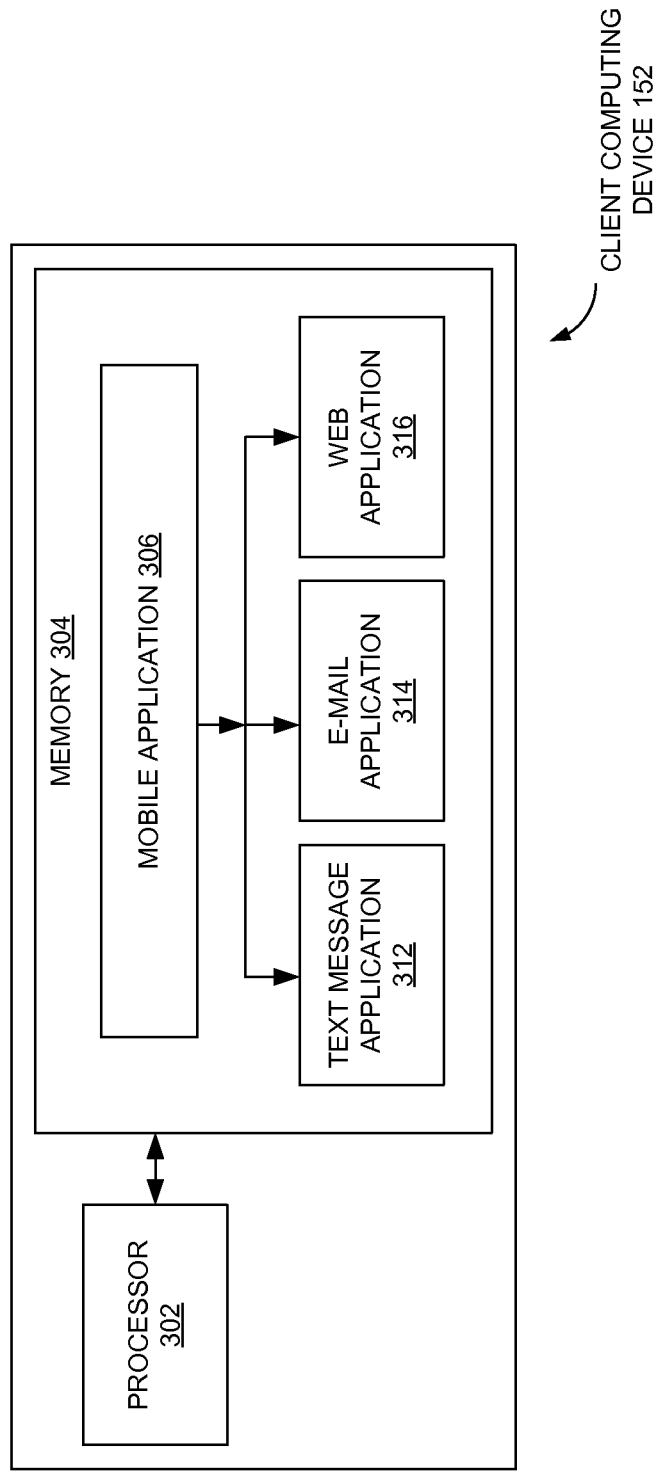
FIG. 3 is a schematic view of a processor and a memory of a client computing device of the communication system of FIG. 1.

FIG. 3 shows client computing device 152, according to one or more embodiments. Client computing device 152 may include a processor 302 communicatively coupled to a memory 304. FIG. 3 shows a mobile application 306 stored in memory 304 of client computing device 152 (obviously, here, client computing device 152 is a mobile phone). In one or more embodiments, mobile application 306 may enable user 150 to select and/or configure desired hardware settings on one or more target computing devices $104_{1-N}$ through client computing device 152. For the aforementioned purpose, in one or more embodiments, mobile application 306 may transmit an appropriate request associated with the configuration of hardware settings on the one or more target computing devices $104_{1-N}$ to request processing module 202 of server computing device 102 in accordance with a predefined communication protocol. In one or more embodiments, once the request is processed through request processing module 202, server computing device 102 may provide the requisite inputs to user interface $142_{1-N}$ installed on target computing devices $104_{1-N}$.

As discussed above, a single user (e.g., user 150) may transmit requests associated with configuring hardware settings on a number of target computing devices $104_{1-N}$. For the aforementioned purpose, target computing devices $104_{1-N}$ may be required to be registered with request processing module 202.

Figure 4:
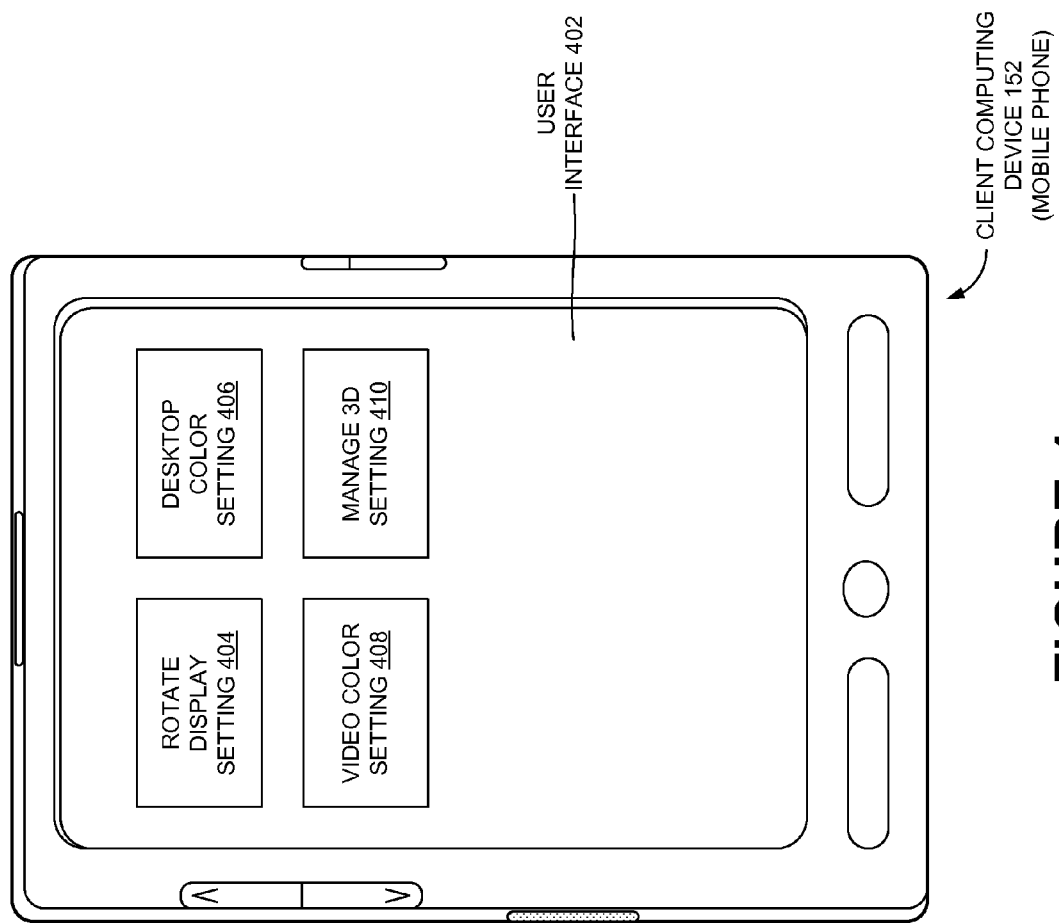
FIG. 4 is an example user interface provided through the execution of a mobile application on the client computing device of FIG. 3.
Figure 5:
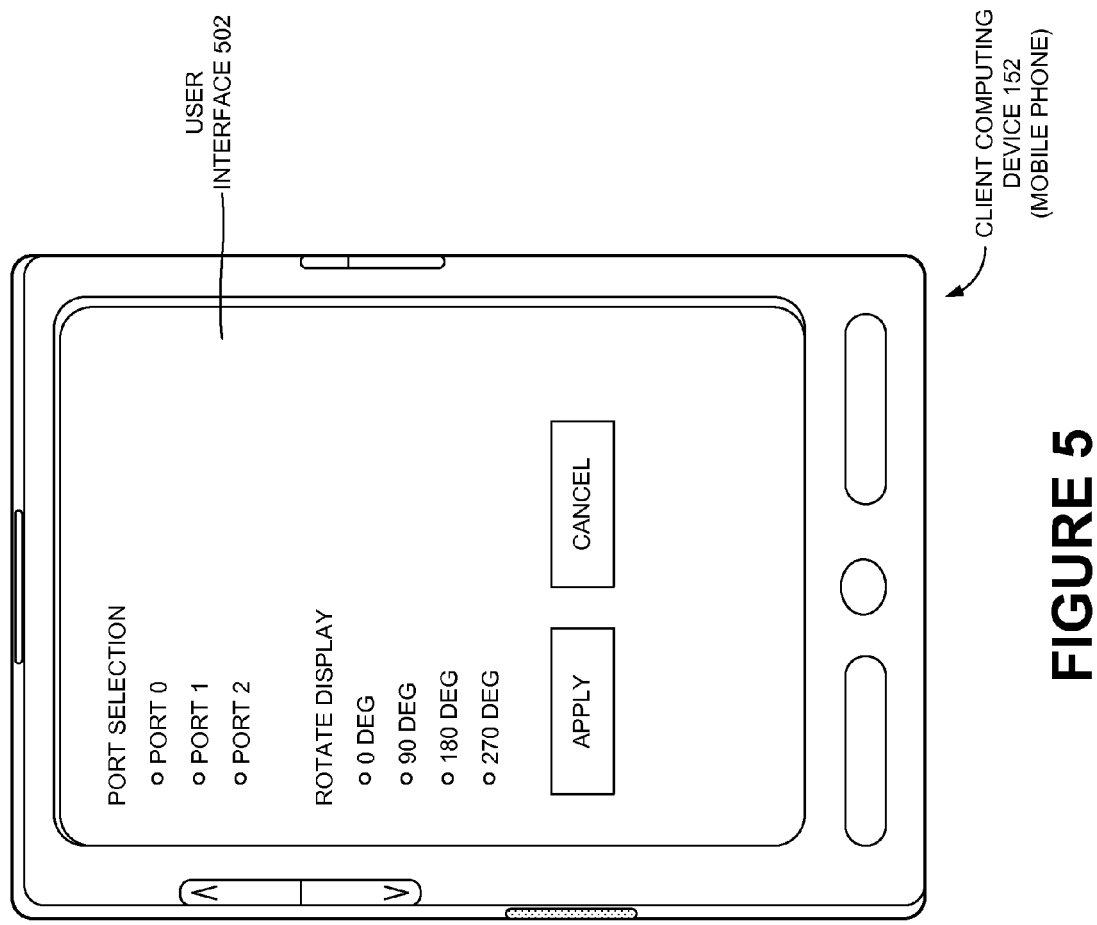

FIG. 4 shows an example user interface 402 provided through the execution of mobile application 306 on client computing device 152. FIG. 4 shows a mobile phone as an example client computing device 152. Example user interface 402 shows example hardware setting configuration buttons such as rotate display setting 404, desktop color setting 406, video color setting 408 and manage 3D setting 410. Upon clicking a button (e.g., rotate display setting 404), another user interface (e.g., user interface 502) describing the corresponding setting(s) may be rendered on client computing device 152. FIG. 5 shows an example user interface 502 as displaying angles to which the screen of display unit $110_{1-N}$ may be rotated and the corresponding graphics processor $122_{1-N}$ port (it is well known that a graphics processor such as a multi-head GPU may have multiple ports (e.g., 4) to drive a corresponding number of displays) to which the rotation corresponds to.

Figure 6:
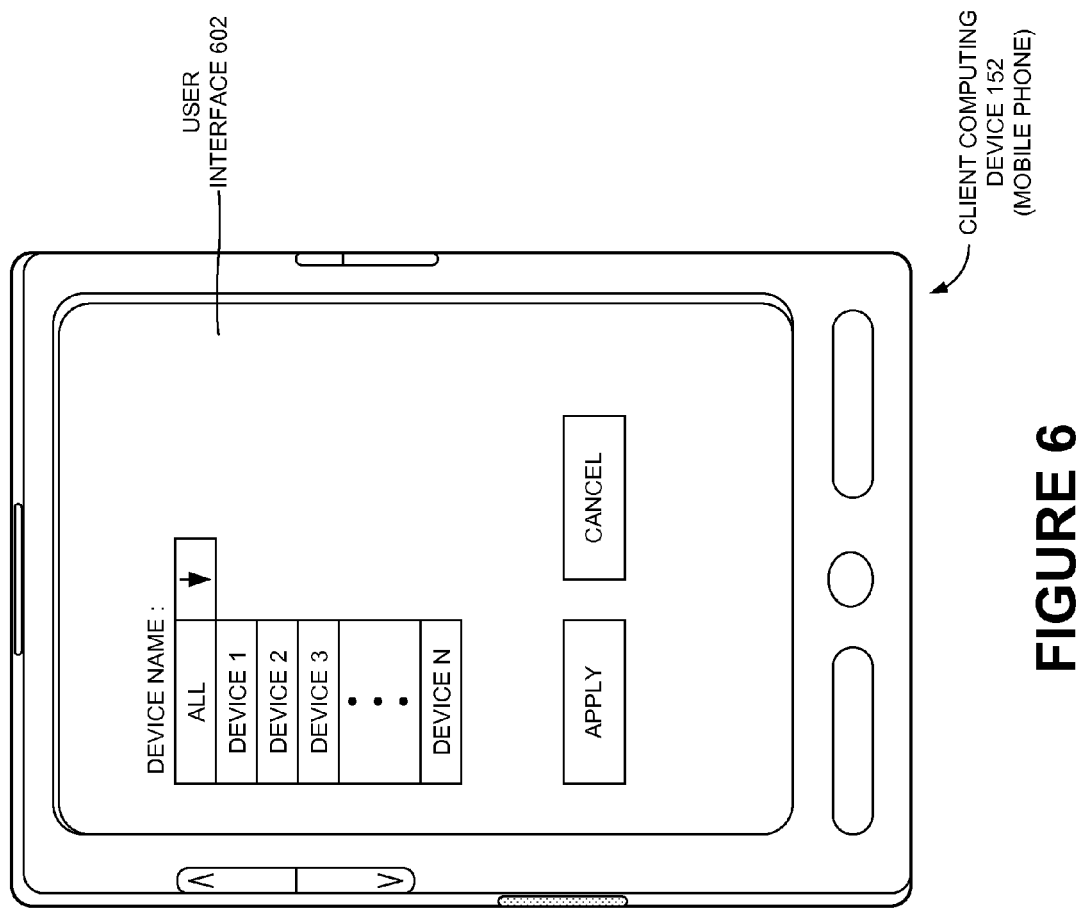

Once the desired setting (say, 90 degrees and port 0) has been selected, user 150 may be directed to yet another user interface (e.g., user interface 602) related to selecting one or more target computing devices $104_{1-N}$ to apply the modified setting(s) to. FIG. 6 shows an example user interface 602 as displaying "All Devices" as an option, along with individual target computing devices $104_{1-N}$ (e.g., Device 1, Device 2, Device 3) also as options. The aforementioned one or more target computing devices $104_{1-N}$ or all target computing devices $104_{1-N}$ may be chosen from accessing a drop-down list.

Upon choosing one or more target computing devices $104_{1-N}$ (or all target computing devices $104_{1-N}$) to apply the modified setting(s) to, mobile application 306 may be configured to generate a text message (e.g., a Short Messaging Service (SMS) message) in an example Protocol Description Unit (PDU) format that is compatible with a mobile communication modem (not shown; provided in client computing device 152, or, part of a service provider) utilized for transmitting the aforementioned text message.

An example protocol template of the text message created may be:
<Setting name> <setting value> <graphics processor port> <target computing device name(s)>
Example text messages include
Rotate 90 port0 All
(or)
Rotate 90 port0 [Device 2, Device 3]

Figure 7:
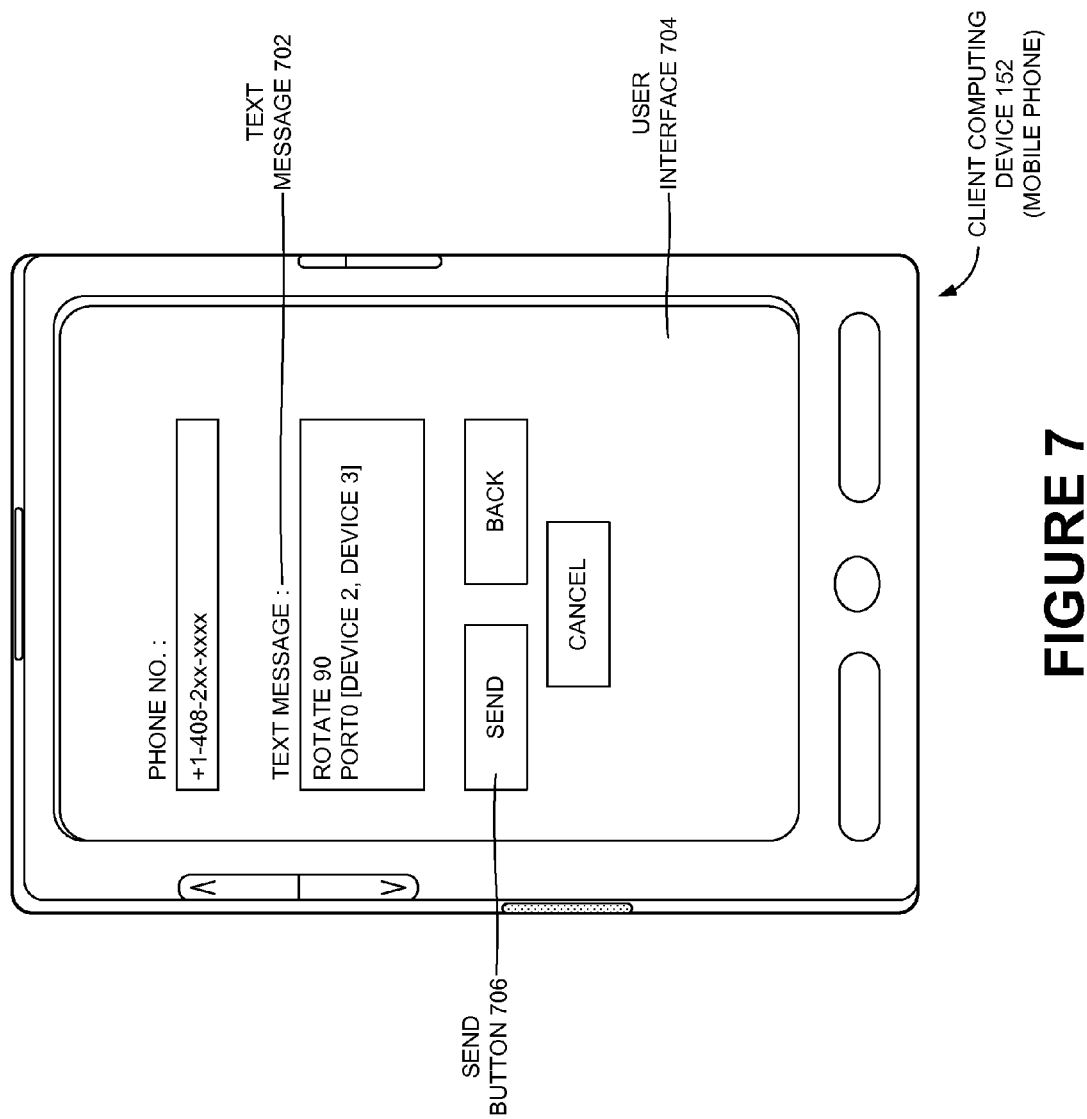
FIG. 7 is an example user interface on the client computing device of FIG. 3 displaying a generated text message corresponding to the application of the hardware setting to the one or more target computing devices of FIG. 1.

As shown in FIG. 7, text message 702 may be displayed through another user interface 704 arrived at after applying the chosen settings in user interface 602. Here, user 150 may have to provide the mobile number associated with client computing device 152. Clicking send button 706 on user interface 704 may transmit text message 702 (e.g., through SMS) to be processed through request processing module 202. Returning to FIG. 2, request processing module 202 may be responsible for fetching, converting, processing and redirecting messages received through various communication mechanisms such as text messages, e-mails and web applications.

For the aforementioned purpose, FIG. 2 shows request processing module 202 as including instructions associated with a text message processing module 206. In one or more embodiments, text message processing module 206 may be responsible for fetching text message 702, conversion of text message 702 from PDU format to text, processing the converted text and redirecting the text to respective target computing devices $104_{1-N}$. In order for quick and efficient processing, text message processing module 206 may be configured to poll server computing device 102 for new text messages. As soon as text message 702 is received at server computing device 102, text message processing module 206 may read text message 702 from memory 304 (e.g., using AT commands) of client computing device 152.

Text message processing module 206 may then convert text message 702 from PDU format to text. If the converted text is in the format of a predefined protocol, the converted text may be validated and transmitted further. Based on information included in the converted text, several input parameters (or, identifiers) such as setting name, setting value, graphics processor port and target computing device name(s) may be segregated. The validated text may then be transmitted (e.g., based on a network broadcast protocol) to desired target computing devices $104_{1-N}$ as per the message details.

In one or more embodiments, each target computing device $104_{1-N}$ may execute an application $132_{1-N}$ (shown as part of memory $124_{1-N}$, but configured to execute on central processor $126_{1-N}$/graphics processor $122_{1-N}$) that exposes Application Programming Interfaces (APIs) to enable direct access to hardware (e.g., graphics processor $122_{1-N}$, display unit $110_{1-N}$) thereof. An example application $132_{1-N}$ may be nVIDIA®'s NVAPI that allows direct access to nVIDIA® GPUs and drivers across all Microsoft® Windows® platforms. NVAPI provides support for categories of operations that range beyond the scope of operations found in APIs such as Microsoft® DirectX® and OpenGL®. While an application $132_{1-N}$ may be envisioned as being tailored to enabling direct access to proprietary hardware (e.g., nVIDIA® hardware), third-party access is also within the scope of the exemplary embodiments.

It is obvious that user 150 may directly type text message 702 in an appropriate format instead of text message 702 being generated through choosing options across one or more user interfaces to initiate the configuration of hardware settings in target computing devices $104_{1-N}$. The user interfaces of FIGS. 4-7 are merely shown for illustrative purposes.

As discussed above, each target computing device $104_{1-N}$ may be required to be registered with request processing module 202 prior to functioning of communication system 100. Further, each target computing device $104_{1-N}$ may also be required to be registered with mobile application 306 (or, any analogous application required for other communication mechanisms).

Returning to FIG. 2 once again, other communication mechanisms may be possible through request processing module 202. FIG. 2 shows request processing module 202 as including instructions associated with an e-mail processing module 208 and a web application processing module 210. For example, instead of transmitting text message 702, user 150 may transmit an e-mail that is processed through e-mail processing module 208 to initiate the configuration of hardware settings in one or more target computing devices $104_{1-N}$. In this case, client computing device 152 may, for example, execute a plug-in to interact with an e-mail client such as Microsoft® Outlook® thereon. E-mail processing module 208 may validate the corresponding request and convert the e-mail into a format compatible for transmission to one or more target computing devices $104_{1-N}$.

In the case of initiating the configuration through a web application (e.g., a web browser) executing on client computing device 152, web application processing module 210 may process a message generated due to the initiation and convert the message into a format compatible for transmission to the one or more target computing devices $104_{1-N}$. The polling of server computing device 102 for new messages and/or extraction of information associated with target computing device(s) $104_{1-N}$ and/or hardware/hardware setting information thereof from the converted e-mail/message may be analogous to the discussion corresponding to text message processing module 206.

Thus, in one or more embodiments, user 150 may possess the capability to configure hardware settings on one or more target computing devices $104_{1-N}$ even when not physically present at the location of server computing device 102 and/or the one or more target computing devices $104_{1-N}$. In one or more embodiments, user 150 may possess the ability to simultaneously initiate configuration of hardware settings on a number of target computing devices $104_{1-N}$. Exemplary embodiments may find utility in an example scenario of user 150 being an administrator of a computer network having to run stress tests on target computing devices $104_{1-N}$ overnight that require modifying hardware settings on target computing devices $104_{1-N}$ at various points in time. Also, as discussed above, configuration of hardware settings may be possible through various communication mechanisms.

It is obvious that in communication mechanisms such as text messages, e-mails and web applications, client computing device 152 may execute appropriate applications to enable the aforementioned communication mechanisms. Returning to FIG. 3 once again, client computing device 152 may include a text message application 312, an e-mail application 314 and a web application 316 to initiate the request(s).

Figure 8:
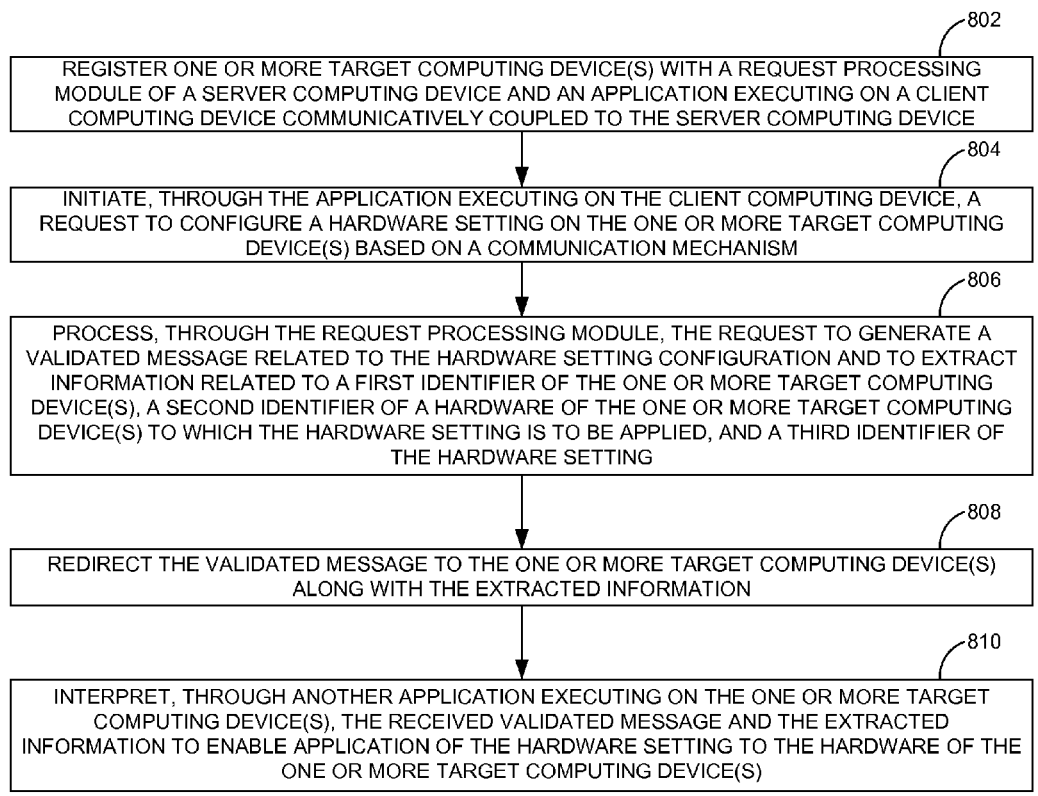
FIG. 8 is a process flow diagram detailing the operations involved in remotely configuring a hardware setting on the one or more target computing device(s) of FIG. 1, according to one or more embodiments.

FIG. 8 shows a process flow diagram detailing the operations involved in remotely configuring a hardware setting on the one or more target computing devices $10_{41-N}$ of FIG. 1, according to one or more embodiments. In one or more embodiments, operation 802 may involve registering the one or more target computing device(s) $10_{41-N}$ with request processing module 202 of server computing device 102 and an application (e.g., mobile application 306) executing on client computing device 152 communicatively coupled to server computing device 102. In one or more embodiments, operation 804 may involve initiating, through the application (e.g., mobile application 306) executing on client computing device 152, a request to configure a hardware setting on the one or more target computing device(s) $10_{41-N}$ based on a communication mechanism.

In one or more embodiments, operation 806 may involve processing, through request processing module 202, the request to generate a validated message related to the hardware setting configuration and to extract information related to a first identifier of the one or more target computing device(s) $104_{1-N}$, a second identifier of a hardware of the one or more target computing device(s) $104_{1-N}$ to which the hardware setting is to be applied, and a third identifier of the hardware setting. In one or more embodiments, operation 808 may involve redirecting the validated message to the one or more target computing device(s) $104_{1-N}$ along with the extracted information.

In one or more embodiments, operation 810 may then involve interpreting, through another application (e.g., application $132_{1-N}$) executing on the one or more target computing device(s) $104_{1-N}$, the received validated message and the extracted information to enable application of the hardware setting to the hardware of the one or more target computing device(s) $104_{1-N}$.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structure and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative rather than a restrictive sense.

What is claimed is:

1. A method comprising:
   registering at least one target computing device with a request processing module of a server computing device and an application executing on a client computing device communicatively coupled to the server computing device;
   initiating, through the application executing on the client computing device, a request to configure a hardware setting on the at least one target computing device based on a communication mechanism;
   processing, through the request processing module, the request to generate a validated message related to the hardware setting configuration and to extract information related to a first identifier of the at least one target computing device, a second identifier of a hardware of the at least one target computing device to which the hardware setting is to be applied, and a third identifier of the hardware setting;
   redirecting, through the request processing module, the validated message to the at least one target computing device along with the extracted information; and
   interpreting, through another application executing on the at least one target computing device, the received validated message and the extracted information to enable application of the hardware setting to the hardware of the at least one target computing device.

2. The method of claim 1, wherein the hardware is at least one of a graphics processor and a display unit of the at least one target computing device.

3. The method of claim 1, wherein the communication mechanism is one of a text message, an e-mail and a web application.

4. The method of claim 1, comprising initiating the request to configure the hardware setting on the at least one target computing device from a location remote to that of the server computing device.

5. The method of claim 1, further comprising:
polling, through the request processing module, the server computing device for new requests; and
reading, through the request processing module, the request initiated through the application from a memory of the client computing device.

6. The method of claim 3, wherein when the communication mechanism is e-mail, the method further comprises:
interacting with an e-mail client on the client computing device through a plug-in executing thereon to generate an e-mail;
reading the e-mail through the request processing module of the server computing device; and
converting, through the request processing module, the e-mail into a format compatible for transmission to the at least one target computing device.

7. The method of claim 1, wherein at least one of:
the server computing device and the at least one target computing device are communicatively coupled to each other through a communication network, and
the client computing device and the server computing device are communicatively coupled to each other through another communication network.

8. A server computing device comprising:
a memory including instructions associated with a request processing module stored therein; and
a processor communicatively coupled to the memory and configured to address storage locations of the memory to execute the request processing module thereon, the processor further being configured to execute instructions to:
enable registration of at least one target computing device communicatively coupled to the server computing device with the request processing module,
receive, from a client computing device also communicatively coupled to the server computing device, a request to configure a hardware setting on at least one target computing device based on a communication mechanism, the at least one target computing device also being registered with an application executing on the client computing device configured to enable initiation of the request,
process, through the request processing module, the received request to generate a validated message related to the hardware setting configuration and to extract information related to a first identifier of the at least one target computing device, a second identifier of a hardware of the at least one target computing device to which the hardware setting is to be applied, and a third identifier of the hardware setting, and
redirect the validated message to the at least one target computing device along with the extracted information to enable interpretation of the validated message and the extracted information at the at least one target computing device in order to apply the hardware setting to the hardware.

9. The server computing device of claim 8, wherein the processor is configured to execute instructions to extract information related to the second identifier of at least one of a graphics processor and a display unit of the at least one target computing device.

10. The server computing device of claim 8, wherein the communication mechanism is one of a text message, an e-mail and a web application.

11. The server computing device of claim 8, wherein the processor is further configured to execute instructions to:
poll, through the request processing module, the server computing device for new requests, and
read, through the request processing module, the request initiated through the application executing on the client computing device from a memory of the client computing device.

12. The server computing device of claim 10, wherein when the communication mechanism is e-mail, the processor is configured to execute instructions to:
convert, through the request processing module, an e-mail received from the client computing device into a format compatible for transmission to the at least one target computing device.

13. The server computing device of claim 10, wherein the processor is configured to redirect the validated message to the at least one target computing device along with the extracted information through a communication network.

14. A communication system comprising:
a server computing device configured to execute a request processing module thereon;
a client computing device communicatively coupled to the server computing device and configured to execute an application thereon; and
at least one target computing device also communicatively coupled to the server computing device and configured to execute another application thereon, the at least one target computing device being configured to be registered with the application executing on the client computing device, and the server computing device further being configured to:
enable registration of the at least one target computing device with the request processing module,
receive, through the request processing module, a request initiated through the application executing on the client computing device to configure a hardware setting on the at least one target computing device based on a communication mechanism,
process, through the request processing module, the received request to generate a validated message related to the hardware setting configuration and to extract information related to a first identifier of the at least one target computing device, a second identifier of a hardware of the at least one target computing device to which the hardware setting is to be applied, and a third identifier of the hardware setting, and
redirect the validated message to the at least one target computing device along with the extracted information,
wherein the at least one target computing device is configured to interpret, through the another application executing thereon, the received validated message and the extracted information to enable application of the hardware setting to the hardware thereof.

15. The communication system of claim 14, wherein the hardware is at least one of a graphics processor and a display unit of the at least one target computing device.

16. The communication system of claim 14, wherein the communication mechanism is one of a text message, an e-mail and a web application.

17. The communication system of claim 14, wherein the client computing device is at a location remote from that of the server computing device.

18. The communication system of claim 14, wherein the request processing module is configured to:
- poll the server computing device for new requests, and
- read the request initiated through the application executing on the client computing device from a memory of the client computing device.

19. The communication system of claim 16, wherein when the communication mechanism is e-mail, the request processing module is configured to:
- convert an e-mail received from the client computing device into a format compatible for transmission to the at least one target computing device.

20. The communication system of claim 14, wherein at least one of:
- the server computing device and the at least one target computing device are communicatively coupled to each other through a communication network, and
- the server computing device and the client computing device are communicatively coupled to each other through another communication network.

* * * * *